United States Patent Office 2,786,873
Patented Mar. 26, 1957

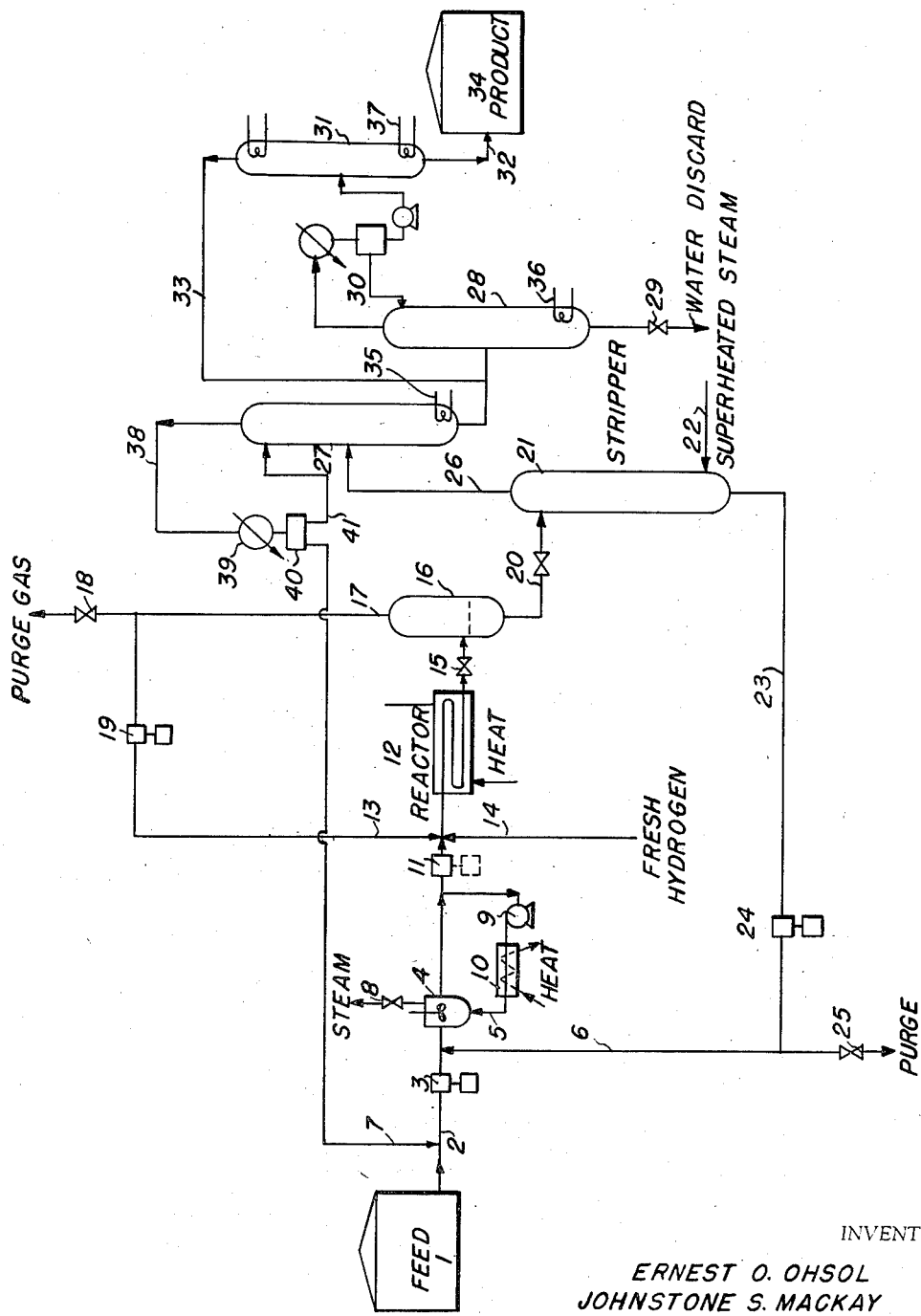

2,786,873

HYDRODEALKYLATION OF TAR ACIDS

Ernest O. Ohsol and Johnstone S. Mackay, Pittsburgh, Pa., assignors to Pittsburgh Coke & Chemical Company, Pittsburgh, Pa., a corporation of Pennsylvania Application February 18, 1955, Serial No. 489,017

25 Claims. (Cl. 260—621)

The present invention relates to the preparation of phenol by the dealkylation of alkyl substituted phenols.

The market for phenol is much greater than the market for the alkylated phenols normally obtained from coal tar or from petroleum or coal hydrogenation.

Prior art attempts to dealkylate the alkyl phenols by thermo-cracking have been made with and without the addition of hydrogen or steam. These prior art methods have suffered from the disadvantage that not only does dealkylation occur, but there is also a substantial amount of dehydroxylation, so that, instead of phenol, the less valuable benzene is formed.

It has also been proposed in the past to dealkylate a phenol by passing hydrogen and an alkylated phenol over a solid catalyst, such as barium oxide, silica gel, nickel sulfide, aluminum oxide, etc., for a short period of time, e. g., less than four seconds. Such process, however, works only with considerable difficulty with cresols, e. g., 72% or more of the cresol is unchanged. Additionally, there is conversion of part of the phenols present to benzene and other hydrocarbons. The present invention further distinguishes from this process in that, in the process just described, the starting phenol is not converted to a salt, whereas in the process of the present invention, the starting phenol is used in the form of a salt, as is disclosed more fully hereinafter.

Frequently it is also desirable to dealkylate the alkylated aromatic hydrocarbons, such as methyl benzenes and methyl naphthalenes, which occur in commercial phenolic fractions. Prior art methods of accomplishing this dealkylation suffer from the disadvantage that the phenolic hydroxyl group is also removed.

If chemically more selective methods, such as oxidation or alkyl group transfer, are employed, they suffer from the disadvantage of relatively high cost.

It is a primary object of the present invention to provide an economical means of dealkylating an alkylated phenol.

It is a further object of the invention to prepare phenol by dealkylating cresylic acid or cresol.

A more specific object is to dealkylate ortho cresol to obtain phenol in good yields.

It is another object to dealkylate a mixture of alkylated phenols and alkylated aromatic hydrocarbons in such a manner as to recover a product in which all or a substantial part of the alkyl groups are removed from both the phenols and the hydrocarbons but the phenolic hydroxyl groups are not removed.

It is an additional object of the invention to provide a method of converting an alkylated phenol to phenol in large scale production utilizing a continuous process.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that, surprisingly, if an alkylated phenol in the form of an alkaline salt is stripped of its alkyl groups with hydrogen at elevated temperature and pressure, the treatment can be carried out without substantial loss of the hydroxy group.

While the reaction is preferably employed to dealkylate cresylic acid or ortho cresol to phenol, it is also operative with other phenols or phenol forming materials. For example, the process is applicable to the dealkylation of lignin salts from the sulfite or soda wood pulping processes, e. g., sodium lignin sulfonate, calcium lignin sulfonate, and sodium lignate. Also, phenol forming materials, such as lignite, coals, e. g., anthracite coal, bituminous coal, semi-bituminous coal, and shale oils can be employed. Thus, normally in the hydrogenation of coal, large quantities of the hydroxyl groups are removed in the process of dealkylation, substantially reducing the yield of phenol. Also, mixtures, such as that fraction of ordinary high temperature coal tar which includes the cresylic acids boiling in the range of 150° to 250° C. or even higher, or similar fractions from low temperature carbonization of coal or from coal hydrogenation can be dealkylated. In addition, less complex phenols and mixtures containing them can be dealkylated, e. g., a metapara cresol cut.

Simultaneous with the dealkylation of the phenols dealkylation of aromatic hydrocarbons accompanying them is obtained. For example, alpha methyl naphthalene, beta methyl naphthalene, tetra methyl benzene and ethyl toluenes, can be simultaneously dealkylated with the dealkylation of the alkylated phenol.

It should be noted that in the hydrodealkylation of the salts of cresylic acids, the latter will be present as solid-liquid melts, while the hydrocarbon will be present at least partly as vapors, increasing the effectiveness of the dealkylation of the aromatic hydrocarbons.

The dealkylation process is normally carried out at an elevated temperature which is normally between 350° and 550° C. More preferably, the temperature is in the range of 400° to 500° C. and most preferably, the temperature is between 400° and 450° C.

Initial hydrogen pressures of about 7 to 150 atmospheres are generally employed with the more preferred range being about 15 to 50 atmospheres and the most preferred range being about 20 to 30 atmospheres. In general, the maximum pressure and final pressure during the hydrogenation both will be within the range of 7 to 150 atmospheres. It is to be understood, however, that hydrogen pressures outside the indicated ranges can be employed, although, generally with inferior results. A preferred source of hydrogen is coke oven gas.

The hydrogen pressure is somewhat dependent upon temperature; in general, the higher the temperature of reaction, the higher the required pressure for satisfactory results.

The alkali should be added in excess of the alkylated phenol. In general, ratios of alkali to phenolic hydroxyl groups on an equivalent basis (e. g., mols of sodium hydroxide to mols of cresol) of 350% of theory to 110% of theory being preferred. As much as 440% or even more alkali can be added. Normally, there is no advantage in using a larger amount of alkali and, in fact, the proportion of the alkylated phenol which reacts is reduced if the alkali is used in too large an excess. The use of a smaller amount of alkali than about 1.1 equivalent per phenolic hydroxyl group results in some dehydroxylation and lowering of yields of the desired phenol.

To some extent, the ratio of alkali to phenol which is preferred depends on the other components of the neutralized charge. The phenols in the starting mixture can be neutralized with alkaline materials, preferably, the alkali metal hydroxides, e. g., sodium hydroxide and potassium hydroxide or the corresponding carbonates, e. g., sodium carbonate or alkaline earth oxides or hydroxides, e. g., calcium oxide and calcium hydroxide. The use of calcium hydroxide is especially desirable if aromatic hydrocarbons, e. g., either or both of the isomeric methyl naphthalenes previously mentioned are present. The amount of aromatic hydrocarbon can be between 0 and 10 parts per part of phenolic constituent in the original mixture.

Contact times between about one to 30 minutes may be used, the time of contact varying to some extent, depending on the temperature employed as well as on the design of the equipment.

In carrying out the process of the present invention, ortho cresol, cresylic acid or other alkylated phenol containing material, with or without admixture of aromatic hydrocarbons, is mixed with the required excess of alkali and the neutralized or alkaline mixture is then brought to a uniformly fused melt with substantial elimination of free moisture. The uniform melt can be obtained either by careful heating with the aid of an agitator or by mixing with a large amount of previously fused melt at a high temperature. The fused or molten charge thus obtained is then subjected to hydrogen pressure in a closed reaction zone under conditions of gas liquid contact. This can be done in a batch or, more preferably, in a continuous process by the use of appropriate apparatus. After a period of reaction, which will depend on the feed stock, hydrogen pressure and temperature, the pressure is released and the converted liquid material is separated from the hydrogen containing gases.

To aid in the separation, some cooling can be provided either prior to the point of gas liquid separation or to the gases leaving the primary separation zone. The hydrogen containing gases can be recycled in part to the reaction zone, the bleed being replaced by the corresponding quantity of fresh hydrogen gas, or the gases may be discarded or purified. Frequently, it is desirable to scrub the purge gas stream with a hydrocarbon oil to remove ethane and other lower hydrocarbons by dissolving them in the oil. The remaining gas will then be enriched in hydrogen and, upon adding additional hydrogen, can be returned to the reaction zone.

The converted liquid products which contain the salts of the phenol (hydroxybenzene) and any unreacted or only partially dealkylated phenols can be sprung with an excess of an acidic material, e. g., sulfuric acid, hydrochloric acid, carbon dioxide or sulfur dioxide. These materials can be added in the form of an aqueous solution or in anhydrous condition. Gaseous materials, such as hydrogen chloride and sulfur dioxide, for example, can be bubbled into the cooled mixture for example. Such methods of converting a phenolate to the free phenol are conventional in the art. After reaction with an acid, the product is distilled to separate pure phenol. Unconverted alkyl phenols are also separated by distillation and can be recycled to the reaction zone. Some by-product material, such as meta cresol, can be retained for sale or for use as such, e. g., it can be recycled for conversion into phenol.

In large scale processing, a more economical and preferred procedure is to recover the phenolic material from the converted alkaline melt at high temperature, e. g., 180° to 400° C., and preferably, 300° to 350° C., by direct steam stripping in a countercurrent contacting device. By steam stripping at sufficiently high temperature, the melt can be stripped of phenolic material as well as hydrocarbons, leaving a caustic bottoms from the distillation zone sufficiently pure and anhydrous, e. g., 0.01% to 5% and preferably <1% water, to be recycled to the reaction zone.

As is evident from the above, although the reactant melt may be anhydrous, it is not essential that it be so. The initial formation of the melt is facilitated by the presence of water.

The heads from the stripping column can be further fractionated to separate unconverted phenolic materials for recycle from the phenol and other desired products, such as meta cresol, and also to separate water.

In the present specification and claims, all parts are by weight unless otherwise specified.

The single figure of the drawing is a schematic flow sheet, illustrating a preferred continuous method for carrying out the invention.

Referring to the drawing, 10 parts per hour of cresylic acid containing feed materials stored in feed tank 1 is fed continuously at a temperature of 50° C. via line 2 and pump 3 to mixer 4, wherein it is contacted with a hot (200° C.) recycle stream of 200 parts per hour of caustic melt, specifically sodium hydroxide of 98% concentration in water, from line 5. Also joining the feed at this point is 10 parts per hour of recycle caustic melt, specifically sodium hydroxide of 95% concentration in water, at a temperature of 220° C. from line 6, and 5 parts per hour of recycle cresylic acids at 150° C. from line 7. A vent line 8 allows water vapors to escape from mixing vessel 4. The melt leaves the mixer 4 at a temperature of 190° C. and is recycled in part, 95%, through pump 9, heater 10, and line 5, while the rest is picked up by high pressure pump 11 and fed as a liquid to the reactor 12 at a rate of 25 parts per hour. The liquid is joined by 2 parts per hour of recycle hydrogen gas from line 13, as well as 1 part per hour of fresh make-up hydrogen from line 14. The gas-liquid mixture is heated in the reactor under conditions of turbulence at a temperature of 450° C. and a pressure of 25 atmospheres. The reacted mixture emerged through back pressure control valve 15 into separator 16. The gases leaving the separator through line 17 are in part purged via line 18 (for example, they may be purged to a scrubber for hydrogen recovery) and in part recycled via booster compressor 19 and line 13, as previously indicated. The liquid leaving separator 16 is fed via line 20 to a continuous stripping tower 21 wherein the melt is stripped of organic material by means of superheated steam (220° C.) injected at the bottom via line 22. The stripped caustic issues from the bottom of the stripping tower via line 23 and is returned in part to the feed blend system with the aid of pump 24 through line 6 in the manner indicated. A small portion, specifically 5%, of the caustic stream is purged via line 25 to maintain purity. The vapors leaving the top of the stripper via line 26 enter fractionating tower 27, wherein an aqueous reflux is maintained. Additional vapors may be generated with the aid of heating coil 35. Under these conditions, alkylated phenols, being more volatile than phenol itself, are taken over through line 38, condensed in condenser 39, decanted in decanter 40, and the alkylated phenols recycled to the feed stream via line 7, in the manner previously set forth. The water layer from decanter 40 is returned to column 27 via line 41. The bottoms from tower 27, containing phenol and water, pass to tower 28 wherein phenol is stripped from an excess of water by distillation with the aid of heating coil 36. The water is discharged from the bottom of tower 28 through line 29 and is discarded. The overhead from tower 28 is condensed, decanted, the aqueous layer returned as reflux via line 30, and the organic layer fed to rectifying column 31, having heating element 37, which separates a bottom stream of anhydrous phenol through line 32 and returns an overhead of phenol water azeotrope to column 28 through line 33. The phenol leaving the system through line 32 is collected as product in tank 34.

In the above example, 8 parts of phenol are produced per hour, which is a yield of 60%, based on the alkylated phenols in the starting material and a yield of 85%, based on the alkylated phenols converted.

The invention, as previously stated, can also be carried out as a batchwise process by mixing the alkylated phenol with alkali, heating to melt the mixture and then subjecting the fused charge to hydrogen pressure in a closed vessel, simultaneously cooling and releasing the pressure and separating the converted liquid material from the hydrogen containing gases. The liquid material is then further cooled, neutralized with acid and the liberated phenol separated and further purified in conventional manner.

In the following examples, all pressures are gauge pressures.

Example I 18 parts of ortho cresol were melted and mixed in a vessel with 7.5 parts of sodium hydroxide with agitation. The temperature of the mixture was raised to 400° C. and hydrogen gas introduced at an initial pressure of 510 p. s. i. The reaction was allowed to continue for 15 minutes. During that time, the hydrogen pressure reached a maximum of 1050 and a final pressure of 450 p. s. i. resulted. The liquid was separated from the gases, cooled and then 35 parts of sulfuric acid of 25% concentration were added. The phenols were then recovered in conventional manner. The neutralized product included 2.4 parts of phenol (15% based on the cresol charged) and 7.8 parts of o-cresol. There were no sodium hydroxide insolubles in the product.

Example II

The procedure of Example I was repeated, using a reaction temperature of 450° C. The maximum hydrogen pressure developed was 1200 p. s. i., and the final pressure to $CH_4$ and $H_2$ at room temperature was 450 p. s. i., as in Example I. The neutralized product contained 4.1 parts of phenol (26% yield), 3.5 parts of o-cresol and 2.0 parts of sodium hydroxide insolubles.

Example III 18 parts of o-cresol were melted and mixed in a vessel with 15 parts of sodium hydroxide with agitation. The temperature of the mixture was raised to 450° C. and hydrogen gas introduced at an initial pressure of 510 p. s. i. The reaction was allowed to continue for 15 minutes. During that time, the hydrogen pressure reached a maximum of 1460 p. s. i. and a final pressure of 690 p. s. i. resulted. The liquid mixture was separated from the gases, cooled and then 70 parts of sulfuric acid of 25% concentration were added. The phenols were recovered from the neutralized mixture in conventional manner. The recovered product included 4.1 parts of phenol (26% yield), 5.6 parts o-cresol, no sodium hydroxide insolubles and 0.85 part of methane.

Example IV

Example III was repeated, using a reaction time of 45 minutes. The hydrogen pressure reached a maximum of 1100 p. s. i. and the final pressure was 550 p. s. i. The final product included 5.9 parts of phenol (37% yield), 7.4 parts of o-cresol and no sodium hydroxide insolubles.

Example V

Example III was repeated, using 30 parts of sodium hydroxide and a reaction time of 45 minutes. The maximum hydrogen pressure developed was 1660 p. s. i., and the final pressure was 790 p. s. i. 150 parts of hydrochloric acid of 20% concentration were used to liberate the free phenols. The final product included 4.3 parts of phenol (27% yield, but a 93% yield, based on the o-cresol which reacted), 12.7 parts o-cresol and no sodium hydroxide insolubles.

Example VI

Example IV was repeated, using an initial hydrogen pressure of 250 p. s. i. The maximum pressure developed was 1200 p. s. i. and the final pressure was 565 p. s. i. The product contained 5.3 parts of phenol (34% yield), 8.4 parts of o-cresol, 1.3 parts of methane and no sodium hydroxide insolubles.

Example VII 21 parts of a cresylic acid containing 92% phenolic constituents and 8% alkylated hydrocarbons, principally, alpha and beta methyl naphthalenes, were melted and mixed with 18 parts of calcium oxide with agitation. The temperature of the mixture was raised to 460° C. and simultaneously, hydrogen gas introduced at an initial pressure of 500 p. s. i. The reaction was allowed to continue for 45 minutes. During that time, the hydrogen pressure reached a maximum of 1600 p. s. i. and a final pressure of 650 p. s. i. resulted. The liquid mixture was separated from the gases, the aromatic hydrocarbons removed by steam stripping and the liquid mixture cooled and then 110 parts of hydrochloric acid of 20% concentration were added. The phenols were recovered from the neutralized mixture in conventional manner. The recovered product included 10.8 parts of phenol, 5.1 parts of the alkylated phenols in the original cresylic acid, 1.1 parts of naphthalene and 0.2 part of the methyl naphthalenes present in the original cresylic acid.

Example VIII

Example I was repeated, using 18 parts of sodium lignin sulfonate and 2 parts of sodium hydroxide. The Temperature of the mixture was raised to 400° C. and hydrogen gas introduced at an initial pressure of 510 p. s. i. The reaction was allowed to continue for 15 minutes. The liquid was separated from the gases, cooled and then 35 parts of sulfuric acid of 25% concentration were added and the dealkylated lignin sulfonic acid recovered in conventional manner.

Example IX

Example VIII was repeated, using sodium lignate in place of the sodium lignin sulfonate. The dealkylated lignin obtained after neutralization with the sulfuric acid was recovered in conventional manner.

From Examples I to VI, it is evident that better yields of phenol are obtained at 450° C. than at 400° C. Increasing the NaOH to o-cresol mol ratio from about 1.1 up to about 4.4 has little effect on the yield of phenol, although, there is a marked drop in the amount of o-cresol reacted. Increasing the time of reaction with the other factors being held constant, increases the yield of phenol. A decrease in the initial hydrogen pressure from 510 to 250 p. s. i. has little effect on the ultimate yield of phenol.

Example X 100 grams of high volatile coal (30% volatile matter) was mulled with 100 cc. of heavy oil and 50 cc. of a 50% NaOH solution. This was charged to an autoclave and pressured with 1500 p. s. i. $H_2$ pressure. The autoclave was heated to 450° C. A pressure of 4500 p. s. i. was obtained. After 60 minutes, the autoclave was cooled, vented and the solid liquid mass discharged. The mass was extracted with 500 cc. of 10% NaOH, filtered and the aqueous layer separated. This solution was acidified with 25% sulfuric acid and the phenols recovered in a conventional manner. Four grams of phenol were obtained along with alkylated phenols.

We claim:

1. In a process for the dealkylation of alkylated phenols in the presence of a hydrogen-containing gas at elevated temperature and pressure, the improvement comprising carrying out the reaction in the presence of more than sufficient alkali to neutralize the phenols.

2. The process of claim 1, in which the reaction is carried out at a temperature in the range of about 350 to about 550° C. and at a pressure of between about 7 and about 150 atmospheres.

3. The process of claim 1, in which the alkali is an alkali metal compound.

4. The process of claim 1, in which the alkali is sodium hydroxide.

5. The process of claim 1, in which the alkylated phenol is mixed cresylic acids.

6. The process of claim 1, in which there are present in the alkylated phenol feed aromatic hydrocarbons comprising methyl naphthalenes and the methyl naphthalenes are converted to naphthalene in the reaction step with hydrogen.

7. The process of claim 1, in which the alkylated phenols are obtained in situ from a natural product from the group consisting of coal and lignin salts.

8. The process of claim 1, in which the alkali is sodium hydroxide, the temperature is between about 400 and about 500° C. and the initial pressure is between about 15 and about 100 atmospheres.

9. The process of claim 1, in which the reaction is carried out at a temperature in the range of about 350 to about 550° C.

10. The process of claim 9, in which the temperature is in the range of about 400 to 450° C.

11. The process of claim 1, in which the alkali is calcium hydroxide.

12. The process of claim 11, in which the alkylated phenol feed mixture contains alkylated aromatic hydrocarbons.

13. The process of claim 12, in which the temperature is between about 350 and about 550° C. and the pressure is between about 7 and about 150 atmospheres.

14. The process of claim 1, in which the equivalent ratio of alkali to the alkylated phenols is in the range of between about 1.1 to 1.0 and about 4.4 to 1.0.

15. The process of claim 14, in which the alkali is sodium hydroxide, the temperature is between about 400 and about 500° C. and the pressure is between about 7 and about 150 atmospheres.

16. The process of claim 14, in which the alkali is calcium hydroxide, the temperature is between about 400 and about 500° C., the pressure is between about 7 and about 150 atmospheres.

17. The process of claim 1, in which the alkylated phenol comprises ortho cresol.

18. The process of claim 17, in which the alkali is sodium hydroxide.

19. The process of claim 18, in which the reaction is carried out at a temperature between about 400 and about 500° C. at a pressure between about 7 and about 150 atmospheres and at an equivalent ratio of sodium hydroxide to alkylated phenol of between about 1.1 to 1 and about 4.4 to 1.

20. The process of claim 1, in which the reaction product is stripped with steam to remove phenolic materials as overheads and alkali melt is recovered as bottoms and the recovered alkali melt is recycled to react with further alkylated phenol.

21. The process of claim 20, in which the alkylated phenol comprises ortho cresol.

22. The process of claim 1, in which the phenolic reaction product is fractionated and unconverted alkylated phenolic compounds are recycled to react with alkali preparatory to further reaction with hydrogen.

23. The process of claim 22, in which the alkylated phenol comprises ortho cresol.

24. The process of claim 1, in which the reaction product is stripped with steam to remove phenolic materials as overheads and alkali melt is recovered as bottoms, the recovered alkali melt is recycled to react with further alkylated phenol, the phenolic material overheads is further fractionated to separate phenol per se from the unconverted alkylated phenols and the unconverted alkylated phenol is recycled to react with the recycled alkali melt preparatory to further reaction with hydrogen.

25. The process of claim 24 in which the alkylated phenol comprises ortho cresol.

References Cited in the file of this patent
UNITED STATES PATENTS

| | | |
|---|---|---|
| 1,947,648 | Hofmann et al. | Feb. 20, 1934 |
| 2,003,941 | Kahl | June 4, 1935 |
| 2,393,699 | Molinari | Jan. 29, 1946 |

OTHER REFERENCES

Industrial and Eng. Chem., vol. 36 (1944), page 596 (1 page).